J N. B. WILSON.
NUT.
APPLICATION FILED MAR. 9, 1918.
1,324,867.
Patented Dec. 16, 1919.
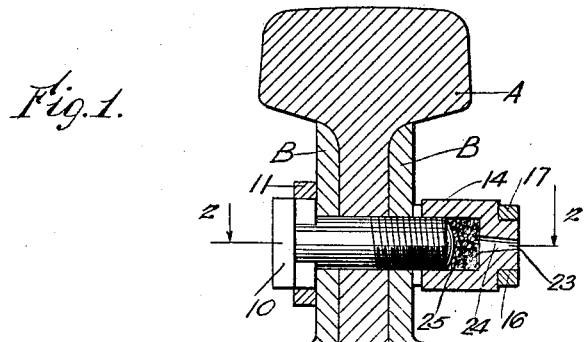
Fig. 1.
Fig. 2.
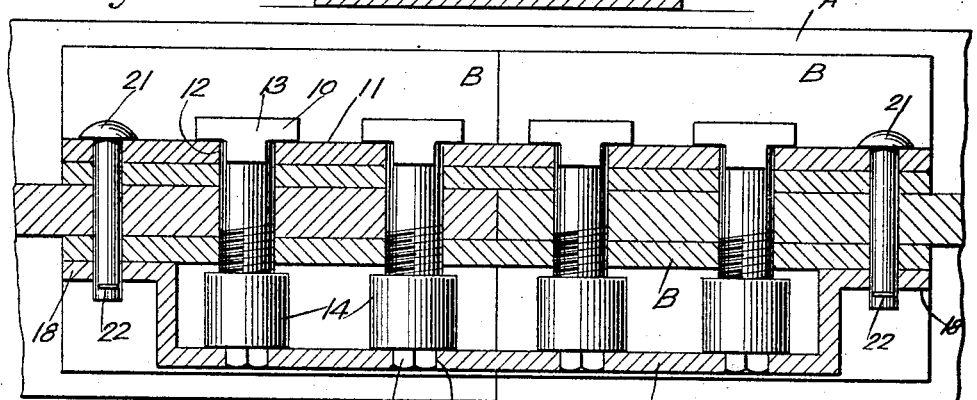
Fig. 3.
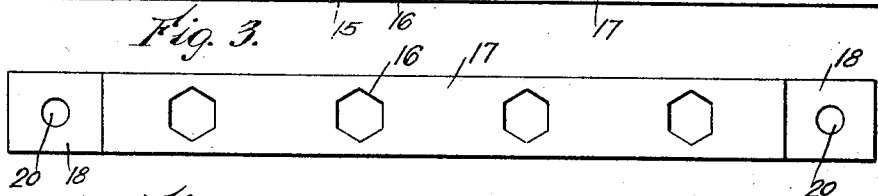
Fig. 4.
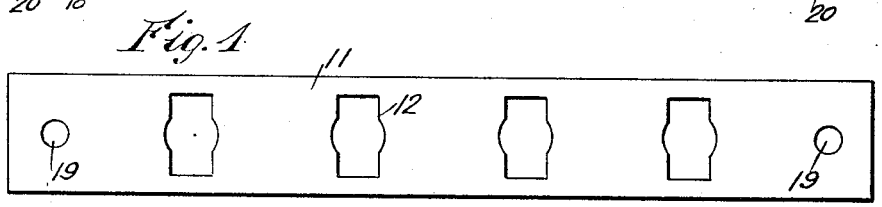
Fig. 5.
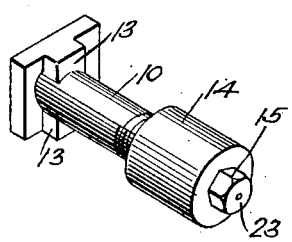
WITNESSES
INVENTOR
J.N.B. Wilson
BY
ATTORNEYS

UNITED STATES PATENT OFFICE.

J NAPOLEON BONAPARTE WILSON, OF ST. LOUIS, MISSOURI.

NUT.

1,324,867.     Specification of Letters Patent.      Patented Dec. 16, 1919.

Application filed March 9, 1918. Serial No. 221,527.

*To all whom it may concern:*

Be it known that I, J NAPOLEON BONAPARTE WILSON, a citizen of the United States, and a resident of St. Louis and State of Missouri, have invented a new and Improved Nut, of which the following is a description.

My invention relates to bolts and nuts for fastening rails or various machine parts, and more particularly relates to devices of the type in which provision is made for preventing the bolt from turning relative to the fastening elements as well as means for preventing turning of the nut on the bolt.

Objects of the invention are to provide a novel nut and locking means therefor, and bolt-locking means, as well as means to engage and fasten both of said locking means.

The invention also has for its object to provide for the effective oiling of the nut in the bolt threads to prevent rusting of the same.

Reference is to be had to the accompanying drawings forming a part of this specification, it being understood that the drawings are merely illustrative of one example of the invention.

Figure 1 is a transverse vertical section, showing a rail fastening means embodying my invention;

Fig. 2 is a horizontal section on the line 2—2, Fig. 1;

Fig. 3 is a face view of one of the locking bars employed;

Fig. 4 is a face view of the other locking bar;

Fig. 5 is a perspective view of the bolt and nut.

I have shown my invention applied to a rail A and its fish plates B. The bolt 10 of my improved fastening passes through a locking bar 11 adjacent to the bolt head, said bar having holes 12 accommodating the bolt and accommodating diametrically opposite lugs 13 on the bolt at the head, the arrangement being such that the bolt cannot turn in the recesses 12 owing to the engagement of the lugs 13 therein.

On the bolt 10 I employ a cap nut 14 which has formed on the outer face of the cap a polygonal boss 15. The bolts and nuts are employed in series and the locking bar 11 is formed with the necessary complement of holes 12 to receive the bolts and their projections 13. Similarly, the polygonal bosses 15 are received in a plurality of corresponding holes 16 in a second locking bar 17. The ends 18 of the locking bar 17 are offset so that the intermediate portion accommodates the nuts 14 while the offset ends will lie flat against the adjacent fish plate B or other element to be fastened. The locking bar 11 at the ends thereof is formed with holes 19 and registering holes 20 are formed in the second locking bar 17. Through the holes 19, 20 and registering holes in the rail A and fish plates B or other elements to be fastened are fastening bolts or pins 21 which receive pins or cotters 22.

With the described arrangement it will be seen that the bolts are prevented from turning by reason of their engagement with the locking bar 11 and the nuts are prevented from turning on the bolts by reason of the engagement of the second locking bar 17 with the polygonal bosses 15, while the two locking bars are fastened by the bolts 21; whereby there can be no relative turning of the bolts or nuts.

In order to oil the threads of the nut 14 and the corresponding threads of the bolt 10, I form an oil hole 23 axially or approximately so in the cap of said nut, said oil hole leading to an inwardly flaring bore 24 extending through the boss 15 and the cap of the nut to the interior thereof. The nut in practice is made of a size that when in position on the bolt 10, there will be a chamber within the nut in front of the bolt adapted to receive cotton waste 25.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

Fastening means of the class described, including a bolt adapted to be passed through the elements to be fastened, and a holding cap nut on the said bolt, said holding cap nut having a lubricant cavity located therein and a lubricant passage extending through the cap of said nut and communicating with said lubricant cavity.

J NAPOLEON BONAPARTE WILSON.